United States Patent [19]
Miyao et al.

[11] 3,913,418
[45] Oct. 21, 1975

[54] SYSTEM FOR CONTROLLING THE DRIVE AND DYNAMIC BRAKING OF AUTOMOBILES

[75] Inventors: Takayuki Miyao; Toshimitsu Sakai, both of Toyota, Japan

[73] Assignees: Aisin Seiki Kabushiki Kaisha, Kariya; Toyota Jidosha Kogyo Kabushiki Kaisha, Toyota, both of Japan

[22] Filed: Sept. 4, 1974

[21] Appl. No.: 503,159

[30] Foreign Application Priority Data
Sept. 5, 1973  Japan................................ 48-99891

[52] U.S. Cl. ...................... 74/856; 74/859; 74/865; 74/867; 60/431; 60/490
[51] Int. Cl.² ......................................... B60K 41/16
[58] Field of Search ............. 74/856, 859, 865, 866, 74/867, 868; 60/431, 490

[56] References Cited
UNITED STATES PATENTS

| | | | |
|---|---|---|---|
| 2,599,387 | 6/1952 | Hefel ................................... | 74/865 |
| 3,292,449 | 12/1966 | Lewis et al............................ | 74/865 |
| 3,721,136 | 3/1973 | Irie....................................... | 74/856 |
| 3,726,159 | 4/1973 | Mizote.................................. | 74/866 |

*Primary Examiner*—Edgar W. Geoghegan
*Attorney, Agent, or Firm*—Finnegan, Henderson, Farabow & Garrett

[57] ABSTRACT

A system for controlling the drive and dynamic braking of automobiles which comprises an automatic control line for varying the prime mover speed with a prescribed relationship maintained between the prime mover speed and the throttle angle changing with the depression or release of an accelerator pedal used with an engine-driven automobile provided with a continuously variable drive ratio transmission, said automatic control line including a cam bearing a specially designed cam surface and connected to a throttle through a link mechanism, a servo valve supplied from the cam with a pilot pressure signal corresponding to its rotation, an output speed responsive-pressure generating governor valve for supplying the servo valve with another pilot pressure signal corresponding to the prime mover speed, and an actuator for changing the drive ratio produced by said continuously variable drive ratio transmission through the selective operation of the servo valve, whereby, when the engine is driven by the depression of the accelerator pedal, the above-mentioned prescribed relationship between the throttle angle and the prime mover speed enables the engine to be driven by fuel consumed at a minimum level for its substantially complete combustion, preventing harmful gases from being evolved from the exhaust and, when the engine drive is slowed down by release of the accelerator pedal, dynamic braking can be effectively carried out.

5 Claims, 18 Drawing Figures

SYSTEM FOR CONTROLLING THE DRIVE AND DYNAMIC BRAKING OF AUTOMOBILES

BACKGROUND OF THE INVENTION

This invention relates to a system for controlling the drive and dynamic braking of an automobile carrying an internal combustion engine as a prime mover and a continuously variable drive ratio transmission.

A continuously variable drive ratio transmission provided for an automobile facilitates its drive to meet the present day demand for an easy drive. Now, requisites for an automobile equipped with said continuously variable drive ratio transmission are to reduce fuel consumption to a minimum level with the engine driven at a given throttle angle and also eliminate as much as possible harmful gases difficult of, for example, chemical treatment to render them harmless, for example, nitrogen oxides from the exhaust. It is further required to drive the engine or slow it down by braking under a satisfactory condition. For braking, the driver gradually releases the accelerator pedal and contracts the carburetor throttle angle to decrease fuel supply. At this time, the driver carries out dynamic braking generally referred to as "engine braking". With general automobiles, however, dynamic braking has not yet proved fully effective, and braking is now mostly undertaken by a static or friction type.

To date, an exclusive pedal for dynamic braking has been provided separately from an accelerator pedal for elevation of dynamic braking effect, thereby driving and braking an automobile through selective operation of both pedals. However, such separate arrangement of the dynamic braking and accelerator pedals complicates the driver's operation, possibly giving rise to the depression of an erroneous pedal. Since an automobile provided with a continuously variable drive ratio transmission aims at easy drive by decreasing the number of control pedals to a minimum, provision of the above-mentioned separate pedals obstructs the advantage of easy drive. Moreover, the changeover of depression from one type of pedal to another unavoidably takes some time, retarding the operation of an automobile.

SUMMARY OF THE INVENTION

The feature of a control system according to this invention is that the drive and dynamic braking of an automobile can be controlled by the depression and release of a single pedal and that the automobile is driven at a minimum fuel consumption with little harmful gas contained in the exhaust.

It is known that the operating condition of a prime mover can be determined from any two of the three factors: the carburetor throttle angle, prime mover speed and output torque. With the control system of this invention, the throttle angle and speed of the prime mover are chosen to have a prescribed relationship. When said prescribed relationship is established, an automobile can be driven by fuel consumed at a minimum level for its substantially complete combustion, preventing harmful gases from evolving from the exhaust, and slowed down by very effective dynamic braking. The relationship between the throttle angle and speed of the prime mover specified by this invention naturally fixes the relationship between the output power and speed of said prime mover. The latter relationship is such that as the output power of the prime mover gradually increases from a point of positive intermediate value relatively near the zero point on the curve of a co-ordinate system, the prime mover speed rises almost proportionately; as the output power of the prime mover gradually falls to the zero point, the prime mover speed increases; and as the output power of the prime mover is absorbed to a larger extent, the prime mover speed is sharply elevated. To maintain the above-mentioned relationship, the automatic control system of this invention has an automatic control line disposed between the throttle and continuously variable drive ratio transmission, causing said throttle and transmission to be operated interlockingly through said control line by the depression and release of a single pedal. This automatic control system comprises a servo mechanism including a cam interlocking with the throttle through a link means, a servo valve, means for supplying the servo valve with oil pressure corresponding to the speed of a prime mover, for example, a gasoline engine and an actuator for operating a lever adjusting the drive ratio produced by the continuously variable drive ratio transmission. Particular consideration is paid to the shape of the cam surface of the servo valve-controlling cam.

The relationship between the output power and speed of the prime mover specified by this invention may be determined from a relationship between the output torque and speed of the prime mover or between the output torque and throttle angle thereof.

It is accordingly an abject of this invention to provide a system for controlling the drive and dynamic braking of automobiles which effectively carries out said control simply by operation of a single pedal so as to realize easy drive.

Another object of the invention is to provide a system for controlling the drive and dynamic braking of automobiles which always maintains the good operating condition of the prime mover so as to reduce fuel comsumption to a minimum level with very little harmful gas contained in the exhaust.

Further objects of this invention will be understood by reference to the later described preferred embodiments and accompanying drawings.

DESCRIPTION OF THE PREFERRED EMBODIMENTS

Figure 1:
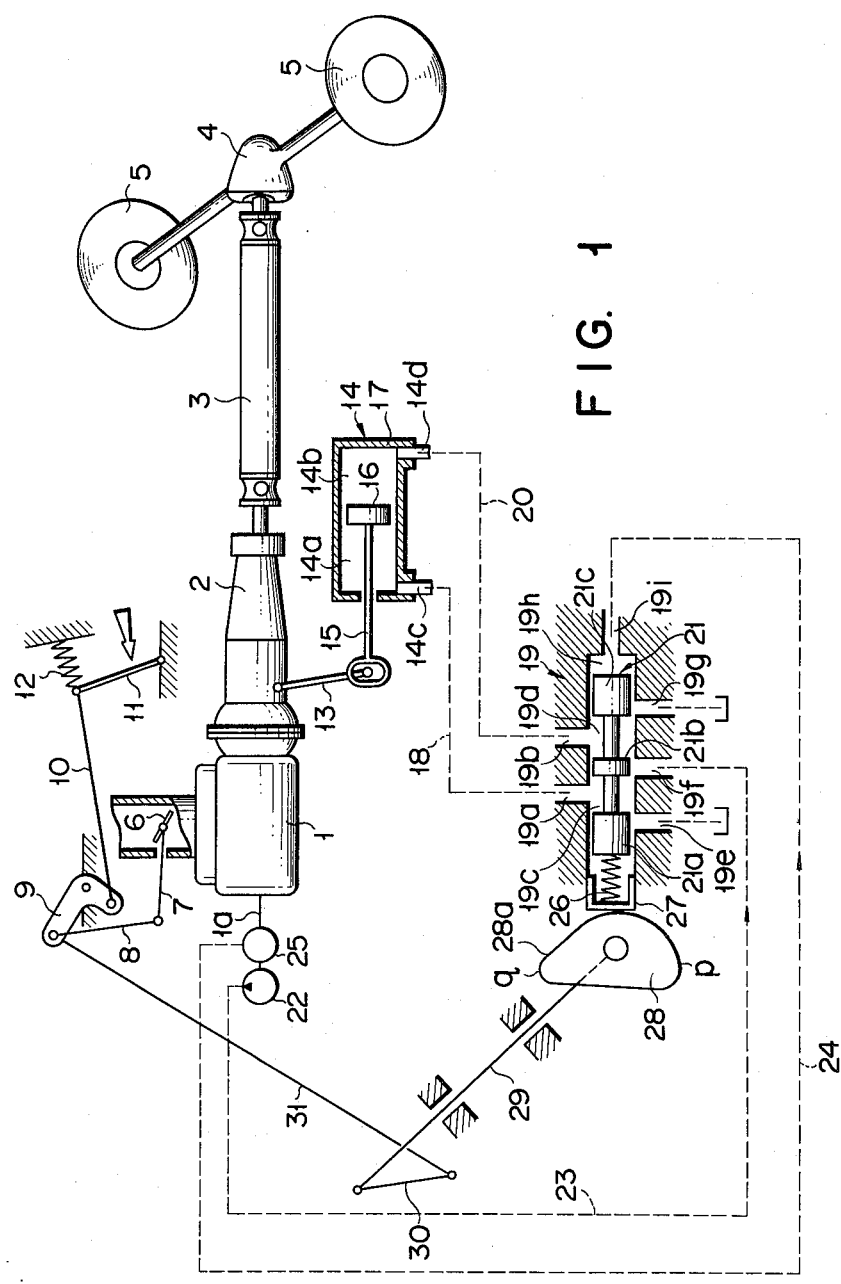
FIG. 1 is a schematic view of a system for controlling the drive and dynamic braking of automobiles according to a first embodiment of this invention.

Referring to FIG. 1, the output shaft $1a$ (only the left side extension is indicated) of a prime mover 1 is connected to a driven load through a continuously variable drive ratio transmission 2. This transmission 2 is coupled with a propeller shaft 3, which in turn is connected to the wheels 5 of an automobile through a universal joint 4. The prime mover 1 is an internal combustion gasoline engine. The carburetor throttle 6 of the prime mover 1 is connected to a personally operable accelerator pedal 11 through a link mechanism consisting of links 7, 8, 9, 10 to control the supply of motive fluid to the prime mover 1. Where the accelerator pedal 11 is brought back to its normal position by a return spring 12, the throttle has a zero angle. The accelerator pedal 11 can be depressed by an automobile driver against the force of the return spring 12.

A lever 13 for adjusting the drive ratio produced by the continuously variable drive ratio transmission 2 is connected to the outer end of the piston rod 15 of an actuator 14 constituting a servo actuator device. The actuator 14 includes a piston 16 fixed to the inner end of the piston rod 15. The piston 16 divides the cylinder 17 of the actuator 14 into two chambers $14a$, $14b$, which communicate with ports $14c$, $14d$ respectively. When the piston 16 takes the extreme right side position, then the transmission 2 indicates a drive ratio of zero by the action of the drive ratio adjusting lever 13. When the piston 16 is shifted to the extreme left side position, the transmission 2 presents a maximum drive ratio. The term "drive ratio" used with the transmission 2 is a value arrived at by dividing an output speed by an input speed. The output speed represents a vehicle speed and the input speed denotes the prime mover speed transferred to the transmission 2.

One port $14c$ of the actuator 14 communicates with one outlet port $19a$ of a servo pilot valve 19 constituting a servo valve device through an oil pressure line 18. The other port $14d$ of the actuator 14 communicates with the other outlet port $19b$ of the servo valve 19 through an oil pressure line 20. The spool 21 of the servo valve 19 consists of three spaced lands $21a$, $21b$, $21c$. An annular groove $19c$ formed between the left side of land $21a$ and central land $21b$ normally communicates with the outlet port $19a$. An annular groove $19d$ provided between the right side of land $21c$ and central land $21b$ normally communicates with the outlet port $19b$. The servo valve 19 further has three ports $19e$, $19f$, $19g$ formed on the opposite side of the valve spool 21 to the first mentioned group of outlet ports $19a$, $19b$ so as to face the three lands $21a$, $21b$, $21c$ respectively. When the outlet ports $19e$, $19f$ are closed by the lands $21a$, $21b$, then the port $19g$ is also closed by the land $21c$. When the spool 21 is shifted to the left to cause the annular groove $19c$ to communicate with the port $19e$, then the other annular groove $19d$ communicates with the inlet port $19f$. When the spool 21 slides to the right to cause the annular groove $19c$ to communicate with the inlet port $19f$, then the annular groove $19d$ is connected to the port $19g$. The ports $19e$, $19g$ communicate with reservoirs respectively.

The inlet port $19f$ is connected through an oil pressure line 23 to a positive displacement pump 22 driven by the prime mover 1 to act as a source of fluid pressure. The pump 22 is connected to the output shaft $1a$ of the prime mover 1. When the prime mover 1 is driven, prescribed oil pressure is applied to the inlet port $19f$ through the oil pressure line 23. An inlet port $19i$ communicates with a chamber $19h$ provided at the right end of the spool 21 and also with an output speed responsive-pressure generating governor valve 25 through an oil pressure line 24. This governor valve 25 is connected to the output shaft $1a$ of the prime mover 1 and supplies the inlet port $19i$ with oil pressure corresponding to the speed of the prime mover 1 through the oil pressure line 24, thus constituting prime mover speed-responding means.

A compression spring 26 whose inner end abuts against the left end face of the spool 21 has its outer end pressed against the inner wall of a cap-shaped follower member 27. This follower member 27 moves upon rotation of the cam 28 in alignment with the traveling direction of the spool 21, that is to the right side of FIG. 1, so as to compress the compression spring 26. The resultant compression force is applied to said spool 21 for rightward movement in FIG. 1. The spring 26 constitutes means for supplying the servo valve 19 with a pilot pressure signal corresponding to the movement of the follower member 27. A rotary shaft 29 constituting the rotation center of the cam 28 is interlocked with the accelerator pedal 11 through a link mechanism consisting of links 30, 31, 9, 10. This interlocking mechanism is effected such that when the accelerator pedal 11 regains its normal position (when the throttle 6 has an angle of zero), then the cam 28 engages the follower member 27 at a point P on the cam surface $28a$; when the accelerator pedal 11 is partially stepped down against the force of the spring 12, then the cam 28 turns clockwise by the rotation of the shaft 29; and when the accelerator pedal 11 is stepped down deepest (when the throttle 6 has a maximum angle), then the cam 28 contacts the follower member 27 at a point $q$ on its cam surface $28a$.

A prime mover is generally desired to produce power through fuel consumed to a minimum level for its substantially complete combustion in order to prevent harmful gases, for example, nitrogen oxides difficult of chemical treatment, from being evolved from the exhaust. As is well known, the operating condition of a prime mover can be detected from any two of the three factors: the throttle angle, speed and output torque of the prime mover.

According to this invention, therefore, an optimum relationship between the throttle angle and speed of a prime mover has been experimentally determined to attain the above-mentioned minimum fuel consumption and the smallest possible content of harmful gases in the exhaust, and the shape of the cam 28 and the urging force of the spring 26 have been defined from said experimentally determined relationship. When this relationship is realized, the spool 21 of the servo valve 19 shuts off the annular groove 19c from the ports 19e, 19f and also the annular groove 19d from the ports 19f, 19g, thereby always maintaining the above-mentioned optimum operating conditions of a prime mover.

Figure 14:
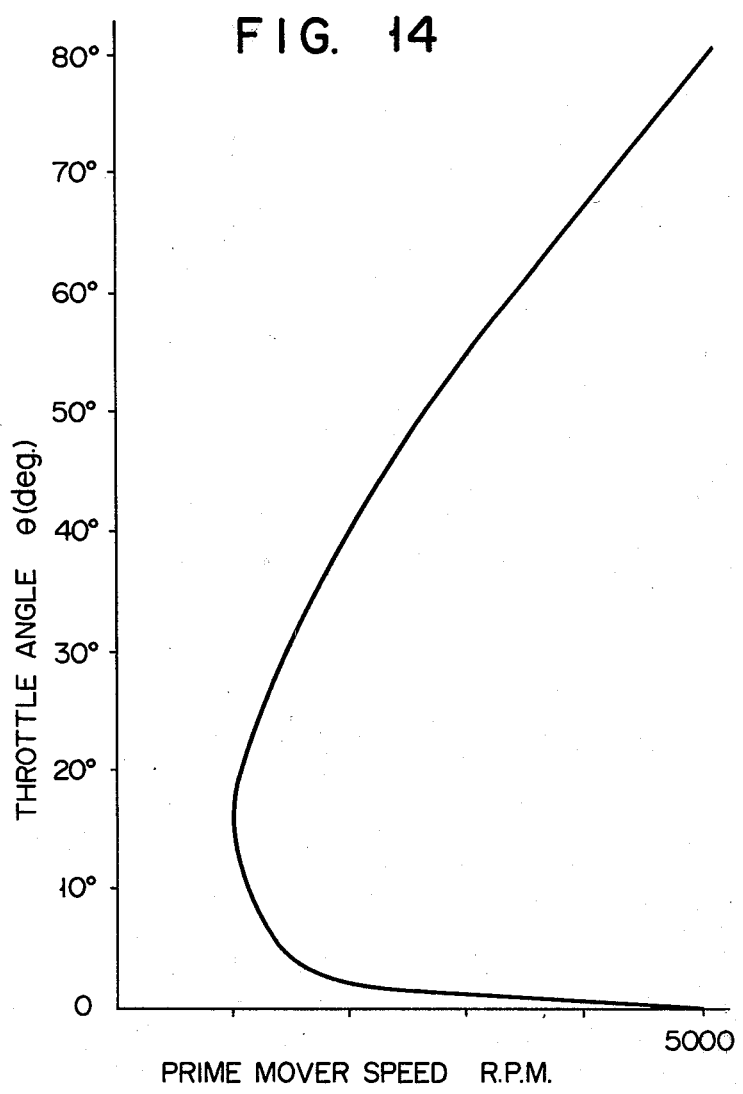
FIGS. 14, 15 and 16 respectively show the relationships specified by the invention between the throttle angle and speed, between the output torque and throttle angle, and between the output torque and speed, all of the prime mover.

The specified or ideal relationship between the throttle angle and speed of a prime mover is set forth in FIG. 14, where, as the throttle angle of the prime mover progressively increases from about 20°, the speed of the prime mover rises almost proportionately. This relationship represents the optimum operating condition of the prime mover required for fuel to be consumed in the smallest possible amount to attain its substantially complete combustion, thereby preventing harmful gases from being evolved from the exhaust. Further, as the throttle angle approaches the zero point from 20°, the prime mover speed is designed to again increase linearly. As previously mentioned, the control device of this invention carries out the drive and dynamic braking of an automobile. Said dynamic braking is effected by a mechanism which elevates the speed of the prime mover as its throttle angle approaches the zero point.

Figure 15:
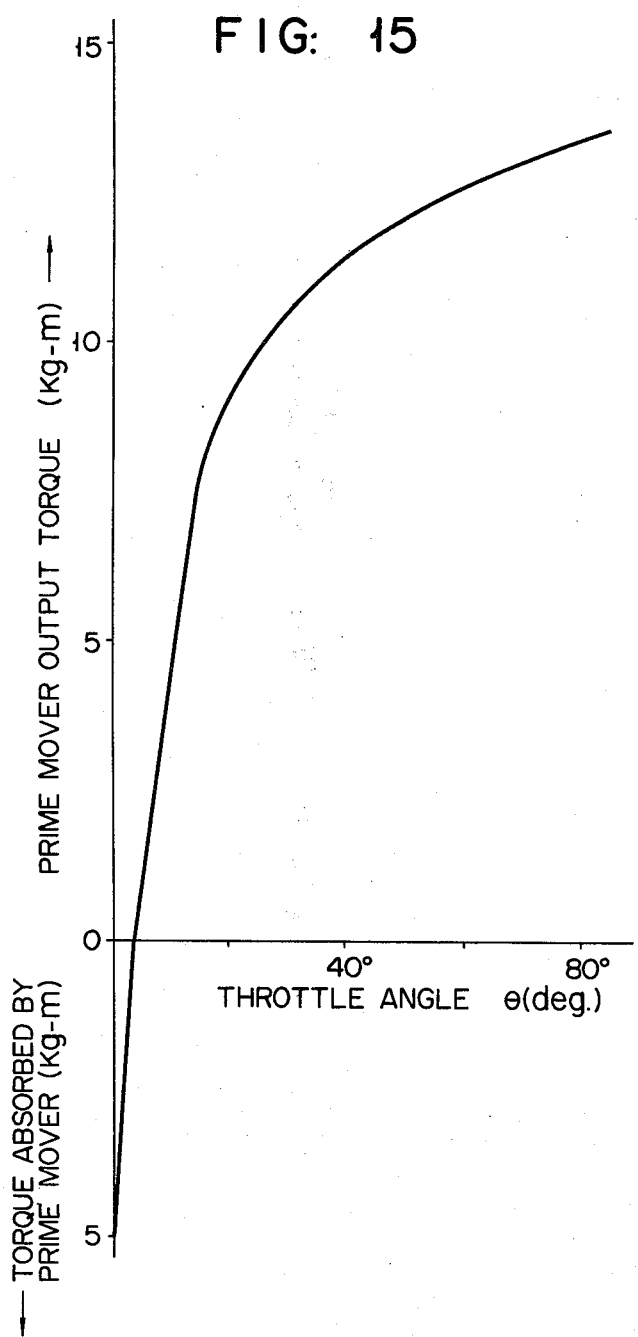
Figure 16:
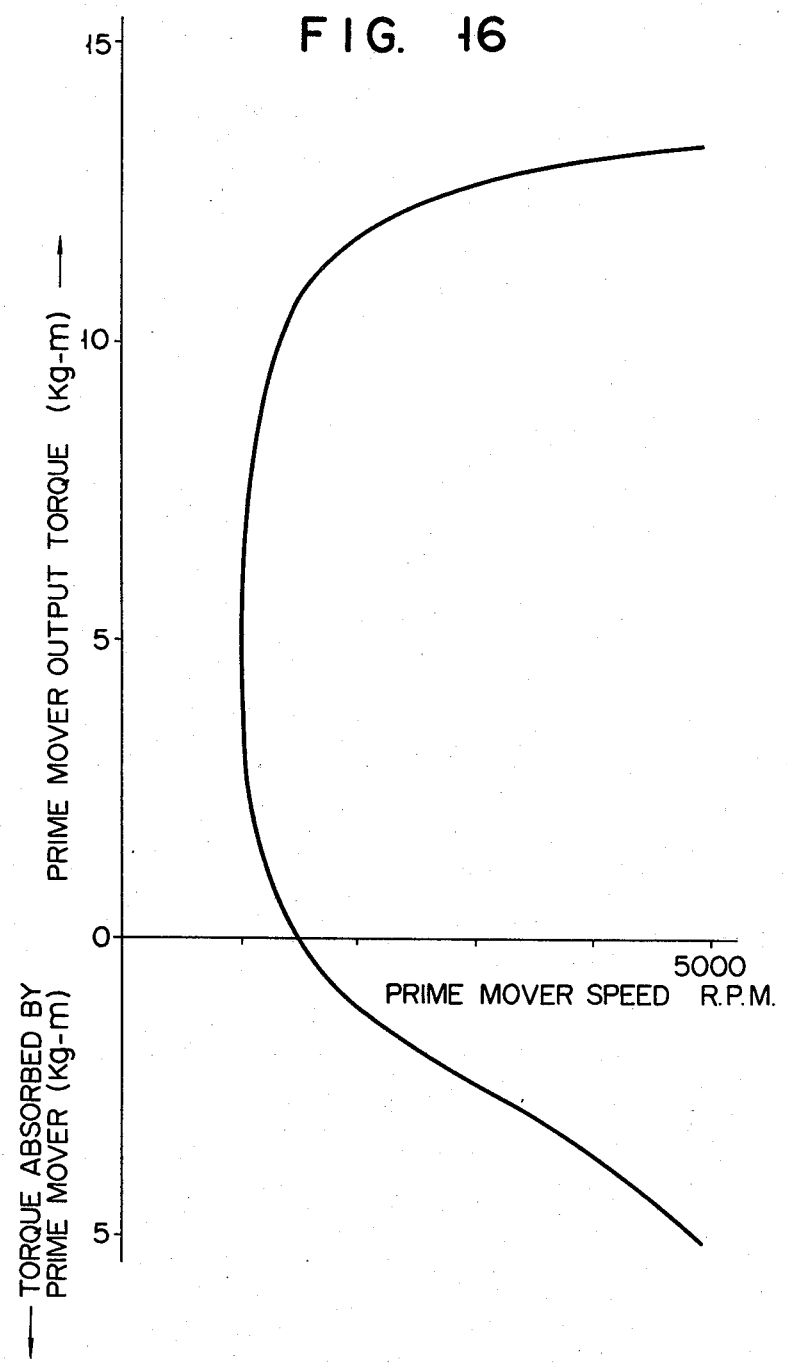

The relationship between the throttle angle and speed of the prime mover may be expressed in the form of a relationship between its throttle angle and output torque, as indicated in FIG. 15, and also in the form of a relationship between its output torque and speed as shown in FIG. 16. Thus the output power and speed of a prime mover have a certain relationship necessarily derived from any two of the three factors: the throttle angle, output torque and speed. This relationship is shown in a dot-dash line in FIG. 2. It is seen from the diagram of FIG. 2 that as the output power of a prime mover gradually increases from a point B denoting a positive intermediate value and disposed relatively near the zero point, the speed of the prime mover rises in substantially direct proportion; as the output power gradually falls toward the zero point from the point B, the speed of the prime mover is also elevated; and as the prime mover absorbs a larger amount of power, its speed sharply rises from the point E to the point F in approximately direct proportion. Under this condition, the prime mover is driven by fuel consumed at a minimum level for its substantially complete combustion, thereby preventing harmful gases, for example, nitrogen oxides from being evolved from the exhaust. The cam 28 has a specially designed cam surface so as to attain a particular relationship specified by this invention.

Where the speed of the prime mover 1 is delayed from the speed defined by the above-mentioned relationship (hereinafter referred to as the "prescribed speed") relative to the angle of the throttle 6 due to changes in the angle of said throttle 6 or in the magnitude of resistance to the run of an automobile, then the spool 21 of the servo valve 19 is shifted to the right to cause the annular groove 19c to communicate with the port 19f and also the annular groove 19d to communicate with the port 19g, applying the oil pressure of the pump 22 to the left chamber 14a of the actuator 14 through the oil pressure line 18 and port 14c and connecting chamber 14b to exhaust. As the result, the piston 16 moves to the right to contract the drive ratio of the continuously variable drive ratio transmission 2 and in consequence decrease the load on the prime mover 1, thereby raising the speed of the prime mover 1 to the prescribed speed. When higher oil pressure is applied to the chamber 19h of the servo valve 19 due to the increased speed of the prime mover 1 and the spool 21 moves to the left to restore the prime mover speed to the prescribed level, then the spool 21 of the servo valve 19 shuts off the annular groove 19c from the port 19f and also the annular groove 19d from the port 19g. Accordingly, the piston 16 of the actuator 14 ceases to travel to the right, preventing the drive ratio of the transmission 2 from being changed and in consequence the prime mover speed from being increased beyond the above-mentioned prescribed level.

Conversely, where the prime mover speed is higher than the prescribed level relative to the angle of the throttle 6, then the spool 21 of the servo valve 19 is shifted to the left to cause the annular groove 19c to communicate with the port 19e and also the annular groove 19d to communicate with the port 19f. As the result, the oil pressure of the pump 22 is applied to the right chamber 14b of the actuator 14 through the line 20 and port 14d, causing the piston 16 to travel to the left and the transmission 2 to indicate a larger drive ratio. Accordingly, an increased load is applied to the prime mover 1 to reduce its speed to the prescribed level. When this condition is reached, the spool 21 of the servo valve 19 shuts off the annular groove 19c from the port 19e and also the annular groove 19d from the port 19f, preventing the piston 16 of the actuator 14 from being shifted to the left, the drive ratio of the transmission 2 from being changed and in consequence the prime mover speed from being slowed down any further.

There will now be described the operation of a system according to this invention for controlling the drive and dynamic braking of an automobile. While an automobile stands at rest, the accelerator pedal 11 is released and brought back to its normal position by the action of the return spring 12. The prime mover throttle 6 has an angle of zero, and the cam 28 engages the cap-shaped follower member 27 of the servo valve 19 at one point p on the cam surface 28 to displace said follower member 27 to the extreme right, compressing the spring 26. As the result, the spool 21 of the servo valve 19 causes the annular groove 19c to communicate with the port 19f and also the annular groove 19d to communicate with the port 19g. Accordingly, the piston 16 of the actuator 14 moves to the right, reducing the drive ratio of the transmission 2 to zero.

When an automobile driver wants to raise the speed of his car to a desired level after the prime mover 1 is started, he generally demands the prime mover 1 to develop larger power than required for a target speed run in an attempt to reach said speed as soon as possible, and is likely first to depress the accelerator pedal 11 deepest. Since, in this case, the prime mover throttle 6 has a widest angle and the prime mover 1 has a drive ratio of zero and is subjected to a small load, the prime move speed rapidly increases. Even in the case of a zero drive ratio, the prime mover 1 always undergoes a slight load due to an effect from a lubricant pump (not shown).

When the prime mover 1 attains the prescribed speed corresponding to the angle of its throttle 6, then the spool 21 of the servo valve 19 shuts off the annular groove 19c from the port 19f and also the annular groove 19d from the port 19g. When the prime mover speed exceeds the prescribed level, then the spool 21 of the servo valve 19 causes the annular groove 19c to communicate with the port 19e and also the annular groove 19d to communicate with the port 19f. Since the piston 16 of the actuator 14 is shifted to the left to increase the drive ratio of the transmission 2, the automobile is rapidly accelerated to a desired speed. In this case, however, the once elevated speed of the prime mover 1 is prevented from being further advanced by the increasing drive ratio of the transmission 2.

If the accelerator pedal 11 were kept in an initially depressed state, then the vehicle speed would rise above a desired level. When, therefore, the vehicle speed approaches the desired level, the driver releases the accelerator pedal 11 toward its original position. As a result, the throttle 6 has a smaller angle to reduce the output power of the prime mover 1. Accordingly, the condition is sustained where the spool 21 of the servo valve 19 causes the annular groove 19c to communicate with the port 19e and also the annular groove 19d to communicate with the port 19f. The piston 16 of the actuator 14 is urged to the left continuously to increase the drive ratio of the transmission 2. Since the increased drive ratio leads to a lower prime mover speed, the vehicle speed is progressively reduced. At this time, the accelerator pedal 11 is released until the angle of the throttle 6 reaches a point on the dot-dash line of FIG. 2 at which sufficient power is provided for the vehicle to run at a desired speed. When the prime mover speed falls to a level corresponding to the above-mentioned final throttle angle, then the spool 21 of the servo valve 19 causes the annular groove 19c to be shut off from the ports 19e, 19f and also the annular groove 19d to be disconnected from the ports 19f, 19g, preventing the piston 16 of the actuator 14 from being moved to the left, namely, attaining the desired vehicle speed due to the elevated drive ratio of the transmission 2 and the resultant decline of the prime mover speed.

Figure 3:
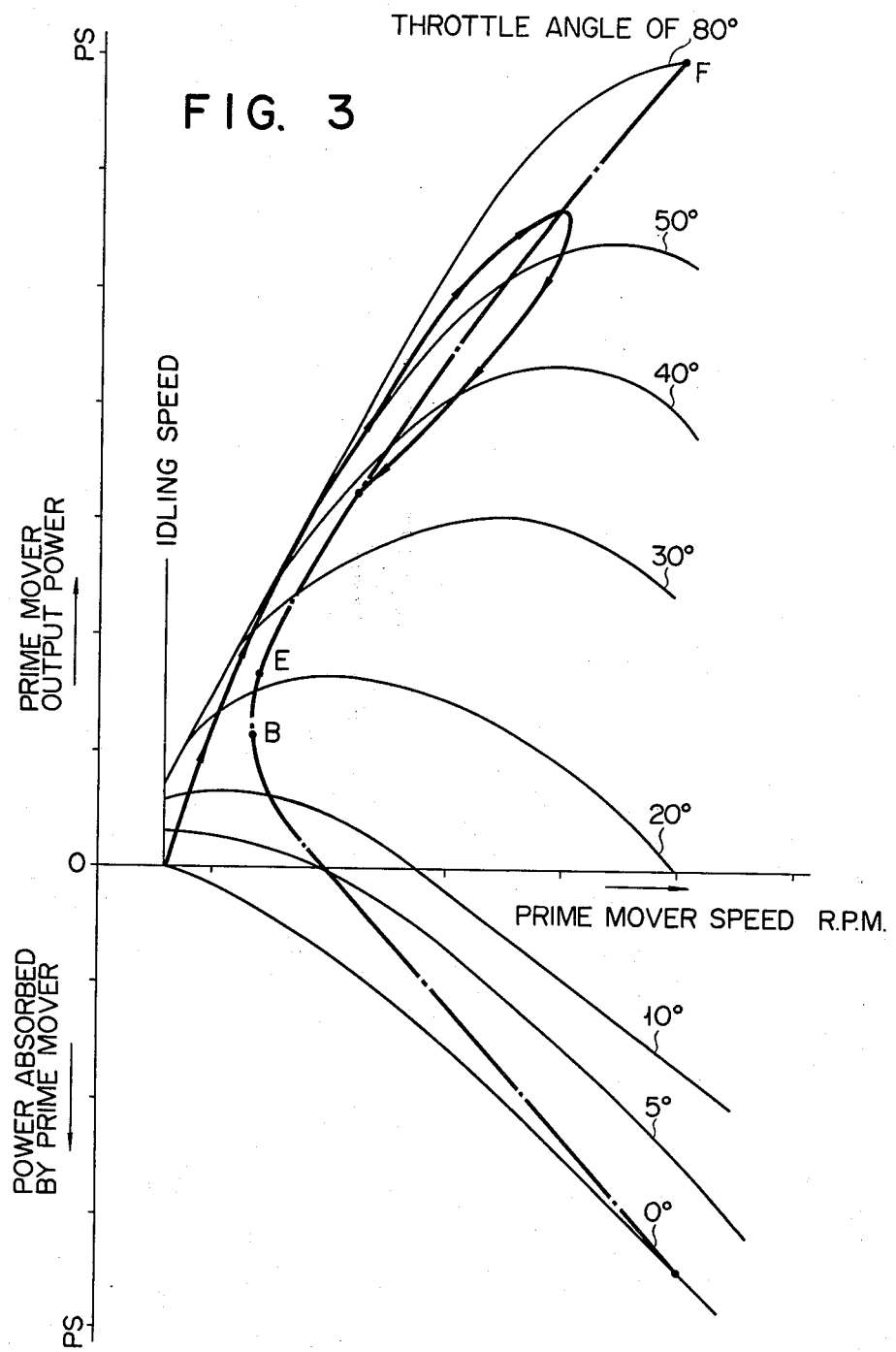
FIGS. 3, 5, 6 and 8 respectively indicate in arrowed solid lines the conditions of the prime mover of an automobile equipped with the control system of the invention when the vehicle is started, accelerated, slowed down and stopped.
Figure 4:
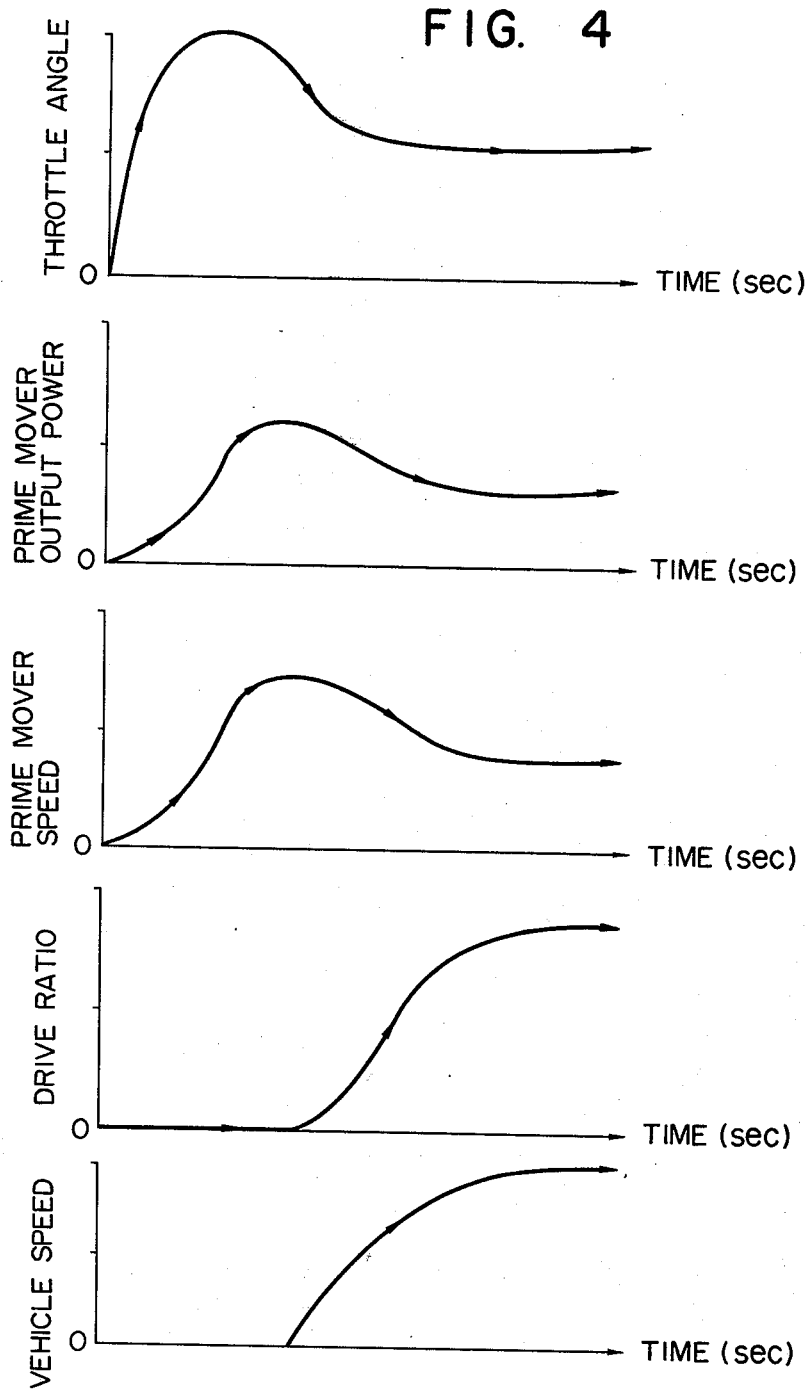
FIGS. 4, 7 and 9 set forth changes with time in the throttle angle, output power and speed of the prime mover, drive ratio and vehicle speed.

The arrowed line of FIG. 3 presents the manner in which the operation of the prime mover 1 varies with the above-mentioned conditions. FIG. 4 indicates changes with time in the output power and speed of the prime mover 1, the drive ratio of the transmission 2 and the vehicle speed.

When the vehicle runs at a given speed with the accelerator pedal 11 stepped down to a fixed level, then an increased resistance to the vehicle run results in its slowdown due to the reduced prime mover speed. In such case, the spool 21 of the servo valve 19 causes due to less fluid pressure in 24, 19h, the annular groove 19c to communicate with the port 19f and also the annular groove 19d to communicate with the port 19g. As a result, the piston 16 of the actuator 14 is shifted to the right to decrease the drive ratio of the transmission 2 and elevate the prime mover speed to a level corresponding to the angle of the throttle 6. Conversely where the vehicle run is subjected to a lower resistance, the prime mover speed and in consequence the vehicle speed rise. At this time the spool 21 of the servo valve 19 causes due to increased fluid pressure in 24, 19h the annular groove 19c to communicate with the port 19e and also the annular groove 19d to communicate with the port 19f, and the piston 16 of the actuator 14 is urged to the left. As a result, the drive ratio of the transmission 2 increases to reduce the prime mover speed to a level corresponding to the angle of the throttle 6.

When the accelerator pedal 11 is depressed to raise the speed of a vehicle to a new desired level, then the spool 21 of the servo valve 19 causes the annular groove 19c to communicate with the port 19f and also the annular groove 19d to communicate with the port 19g. The piston 16 of the actuator 14 is moved to the right with a resultant decline in the drive ratio of the transmission 2. Thus the prime mover 1 obtains a higher speed due to its enlarged output power resulting from the broadened throttle angle and the reduced ratio of the transmission 2. When said drive ratio is decreased, the vehicle speed is prevented from dropping, because the product arrived at by multiplying the rising prime mover speed by the drive ratio (vehicle speed) has a time constant falling within the range where said product or vehicle speed does not decline with time.

When the prime mover speed exceeds a level corresponding to the broadened angle of the throttle 6, then the spool 21 of the servo valve 19 causes the annular groove 19c to communicate with the port 19e and also the annular groove 19d to communicate with the port 19f. The piston 16 of the actuator 14 is urged to the left with a resultant increased drive ratio of the transmission 2, preventing the prime mover speed from being further elevated. However, the vehicle speed rises due to the increased drive ratio of the transmission 2.

Figure 5:
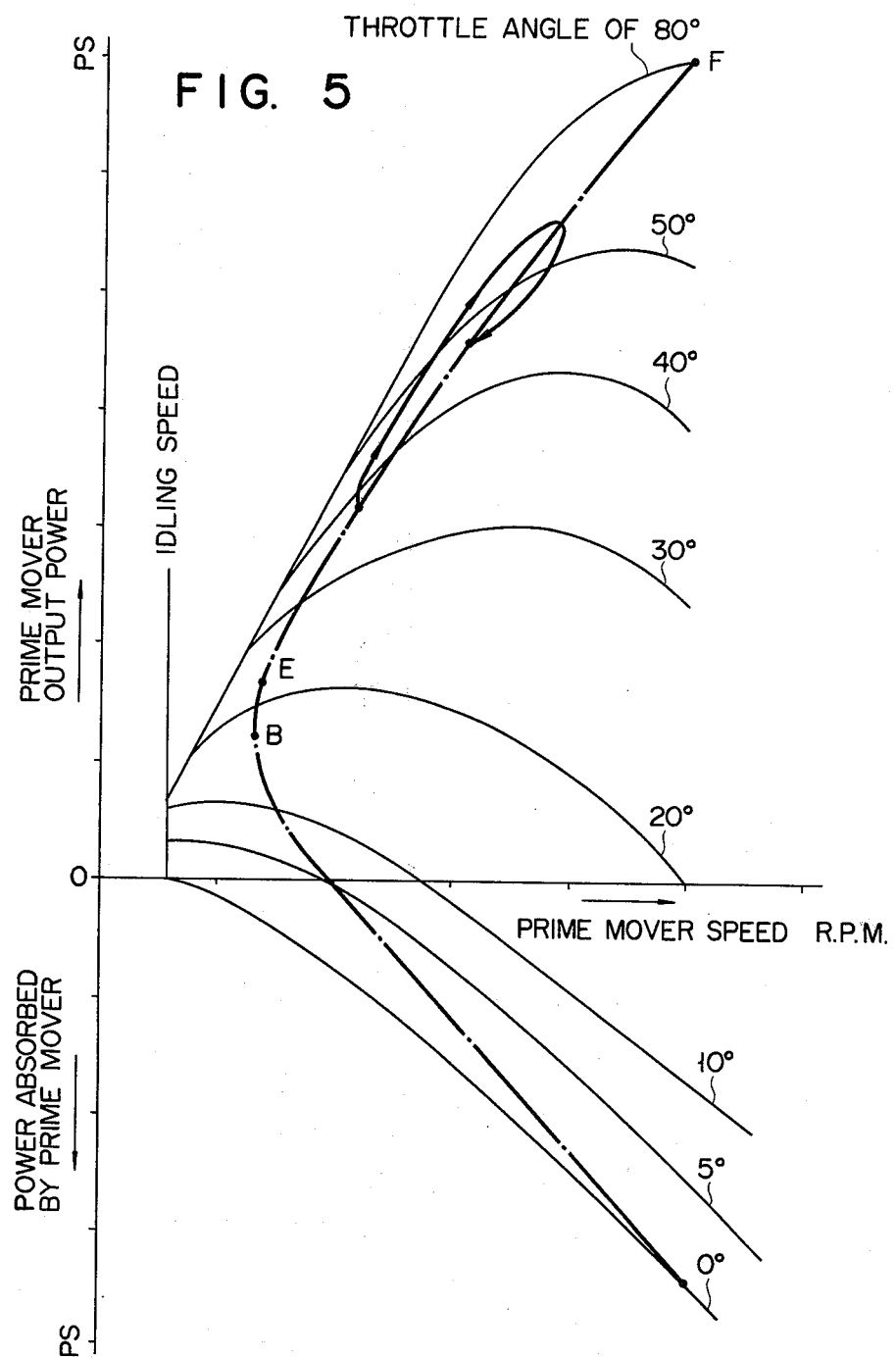

When the vehicle speed approaches a new desired level and the accelerator pedal 11 is brought back to its original position, then the throttle 6 has a smaller angle to decrease the output power of the prime mover 1. At this time, the spool 21 of the servo valve 19 causes the annular groove 19c to communicate with the port 19e and also the annular groove 19d to communicate with the port 19f, thereby elevating the drive ratio of the transmission 2. The prime mover speed is slowed down, causing the vehicle speed to increase at a progressively smaller rate. The angle of the throttle 6 is contracted until it reaches a point on the dot-dash line of FIG. 2 at which the prime mover 1 produces sufficient power for the vehicle to run at a new desired speed. When the prime mover speed declines to a level corresponding to the above-mentioned final throttle angle, the spool 21 of the servo valve 19 causes the annular groove 19c to be shut off from the ports 19e, 19f and also the annular groove 19d from the ports 19f, 19g to stop the leftward movement of the piston 16 of the actuator 14 as well as the larger drive ratio of the transmission 2 and the slowdown of the prime mover speed, thereby bringing the vehicle speed to a new desired level. The arrowed line of FIG. 5 shows the manner in which the operation of the prime mover 1 varies with the above-mentioned cases.

When the accelerator pedal 11 is released to slow down the vehicle speed to a new desired level, then the spool 21 of the servo valve 19 causes the annular groove 19c to communicate with the port 19e and also the annular groove 19d to communicate with the port 19f. The piston 16 of the actuator 14 travels to the left to increase the drive ratio of the transmission 2. The prime mover falls in speed due to its smaller output power resulting from the contracted angle of the throttle 6 as well as to the larger drive ratio of the transmission 2. At this time, however, the vehicle speed is still substantially prevented from being decreased, namely, because the vehicle is maintained in the so-called idling state.

Figure 2:
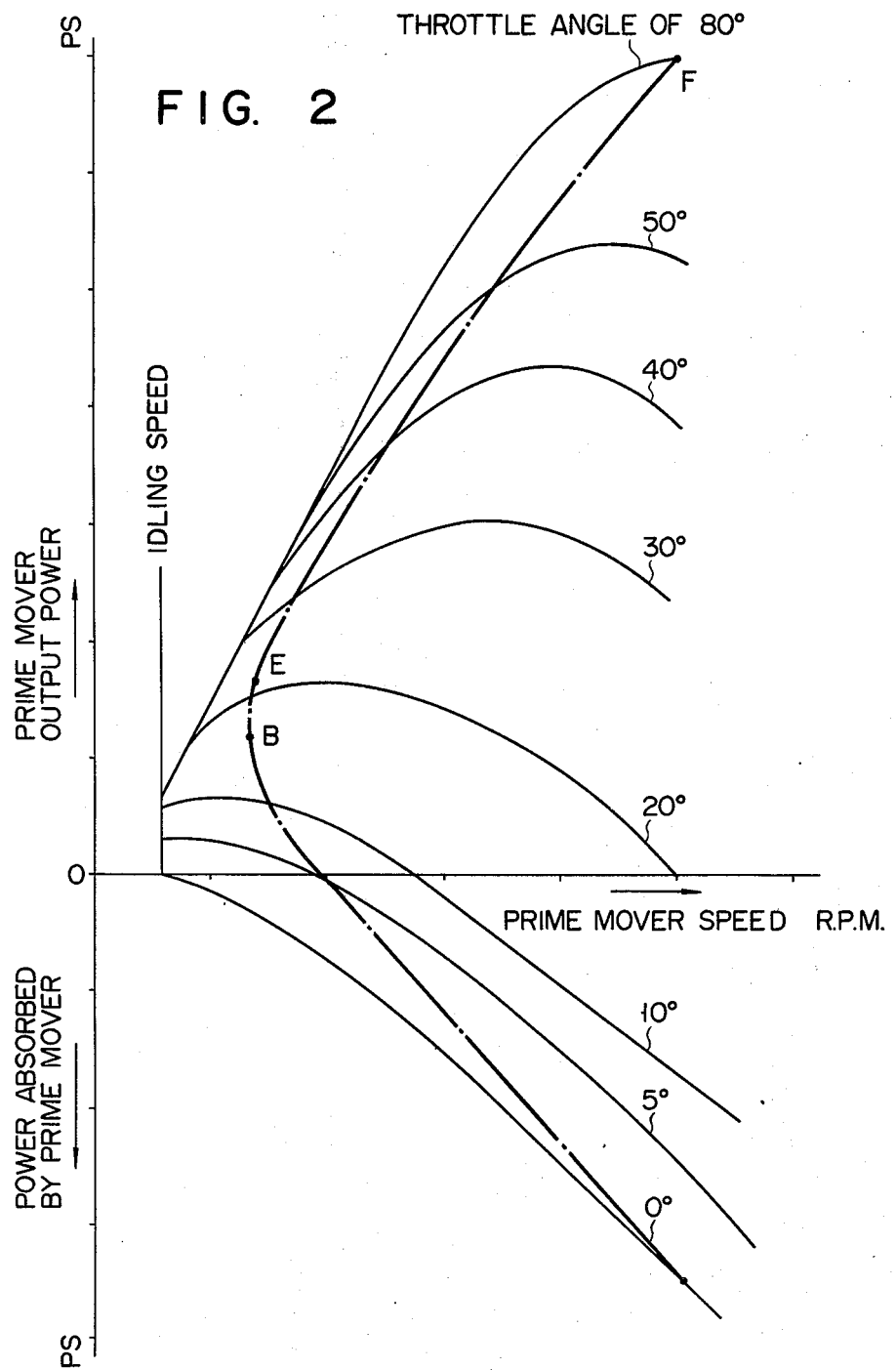
FIG. 2 is a diagram showing a relationship between the output power and speed of a prime mover specified by this invention.

When the throttle angle is contracted until it reaches the point B on the dot-dash line of FIG. 2 and then to a further extent, the spool 21 of the servo valve 19 causes the annular groove 19c to communicate with the port 19f and also the annular groove 19d to communicate with the port 19g, the piston 16 of the actuator 14 travels to the right to decrease the drive ratio of the transmission 2, causing the prime mover 1 to rise again in speed and absorb its output power. Namely, the dynamic braking control begins to be effected, with a resultant lower vehicle speed.

There will now be described the manner in which the prime mover 1 absorbs power. The more contracted the throttle angle, the smaller the drive ratio of the transmission 2. As the prime mover speed becomes higher, the throttle angle decreases, causing more power to be absorbed by the prime mover. When the throttle 6 has a zero angle, the drive ratio of the transmission 2 is decreased until the prime mover speed attains the highest level, causing a maximum amount of power to be absorbed by the prime mover. The above-mentioned dynamic braking generally referred to as the "engine braking" is more prominently effected by this invention than is customarily practised.

When the acceleration pedal 11 is depressed to make the vehicle speed approach a new desired level from the above-mentioned condition, the spool 21 of the servo valve 19 causes the annular groove 19c to communicate with the port 19e and also the annular groove 19d to communicate with the port 19f. Accordingly, the piston 16 of the actuator 14 travels to the left to increase the drive ratio of the transmission 2 and in consequence reduce the prime mover speed. Thus the prime mover 1 absorbs a less amount of power due to a lower prime mover speed and broadened throttle angle, causing the vehicle speed to slow down gradually.

Figure 6:
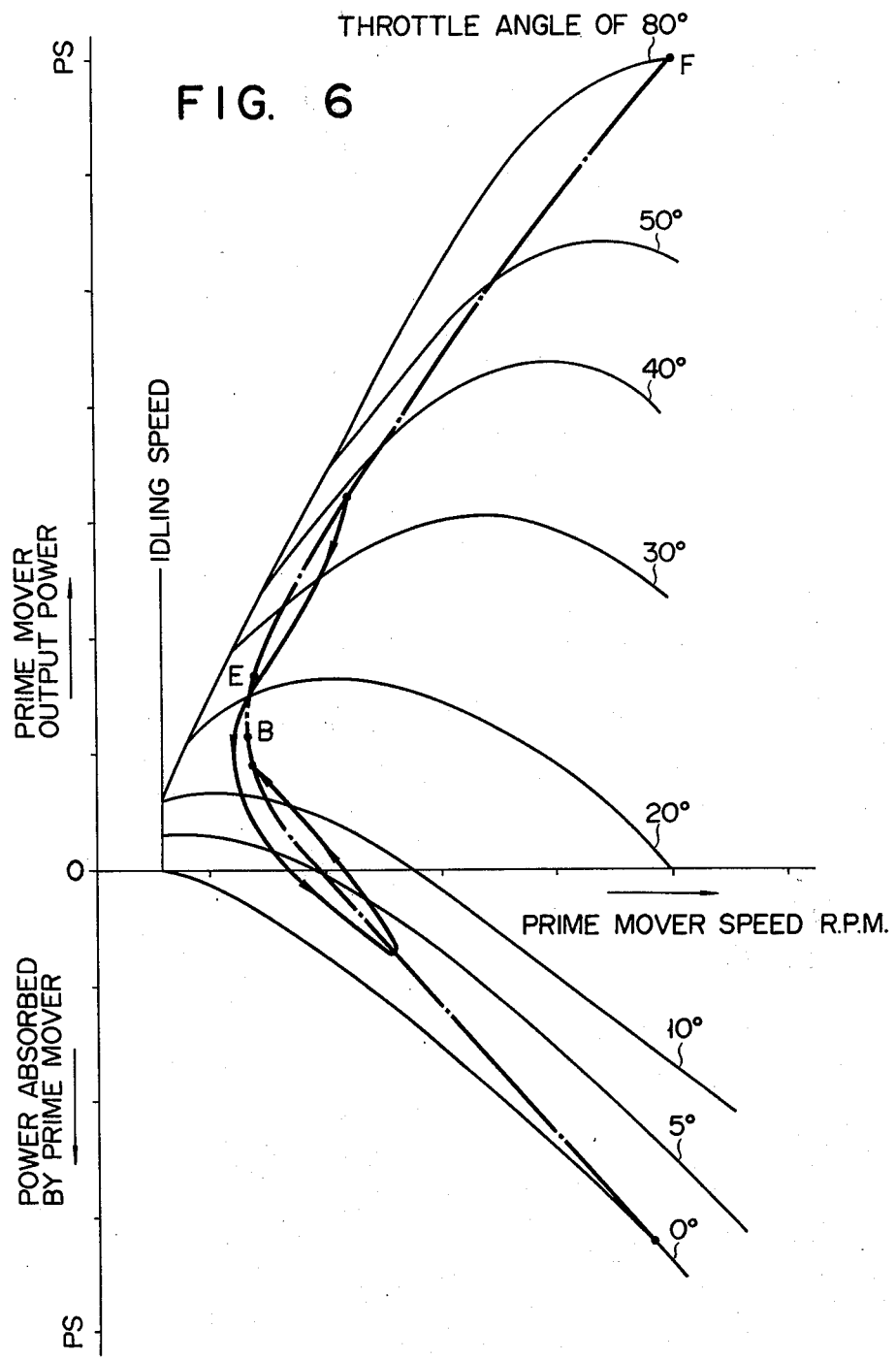
Figure 7:
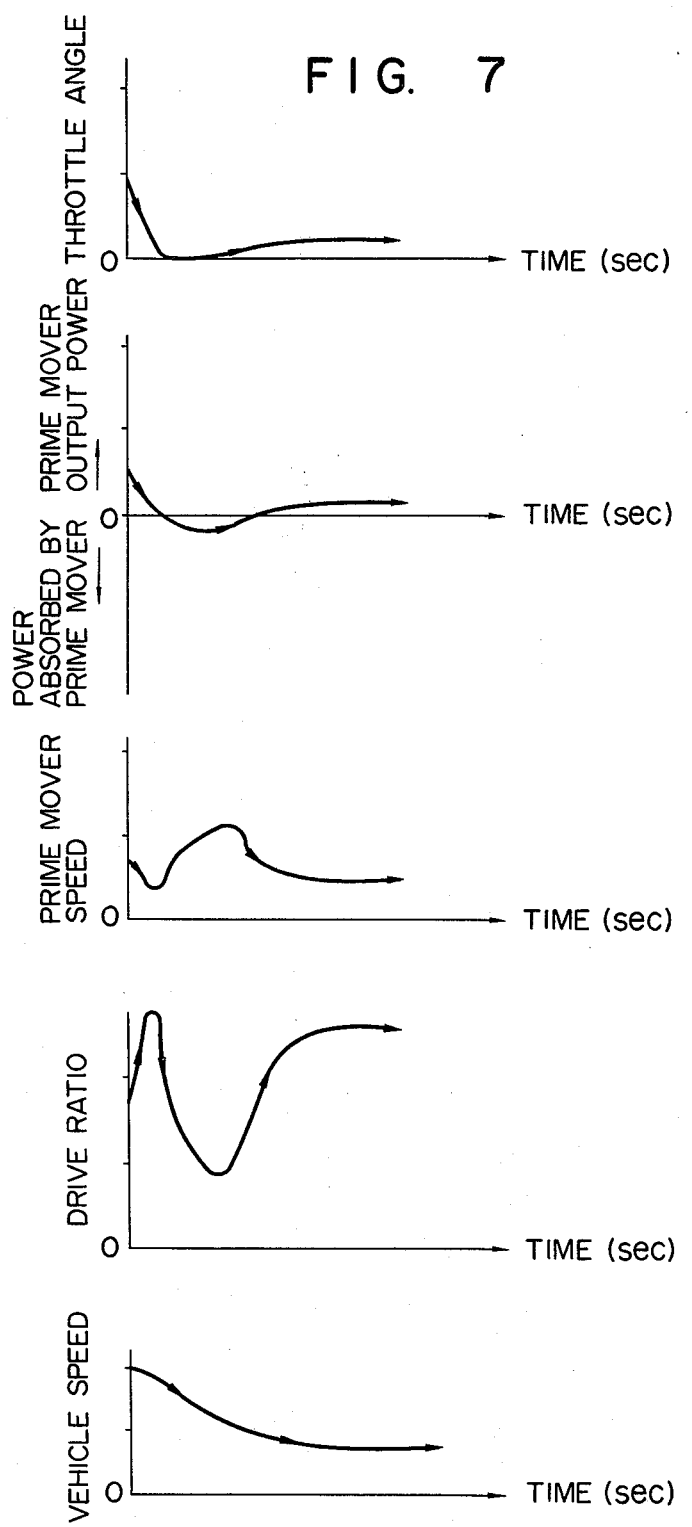

The throttle angle is finally enlarged until it reaches a point on the dot-dash line of FIG. 2 at which the prime mover produces sufficient power for the vehicle to run at a desired speed. When the prime mover speed reaches a level corresponding to the above-mentioned final throttle angle, then the spool 21 of the servo valve 19 causes the annular groove 19c to be shut off from the ports 19e, 19f and also the annular groove 19d to be disconnected from the ports 19f, 19g, bringing the piston 16 of the actuator 14 to rest, stopping any further increase in the drive ratio of the transmission 2 and prime mover speed. As the result, the vehicle attains a new desired speed and runs by the output power of the prime mover 1. The arrowed line of FIG. 6 sets forth the manner in which the operation of the prime mover varies with the above-mentioned cases. FIG. 7 shows changes with time in the throttle angle, speed and output power of the prime mover 1, the drive ratio of the transmission 2, and the vehicle speed.

Figure 8:
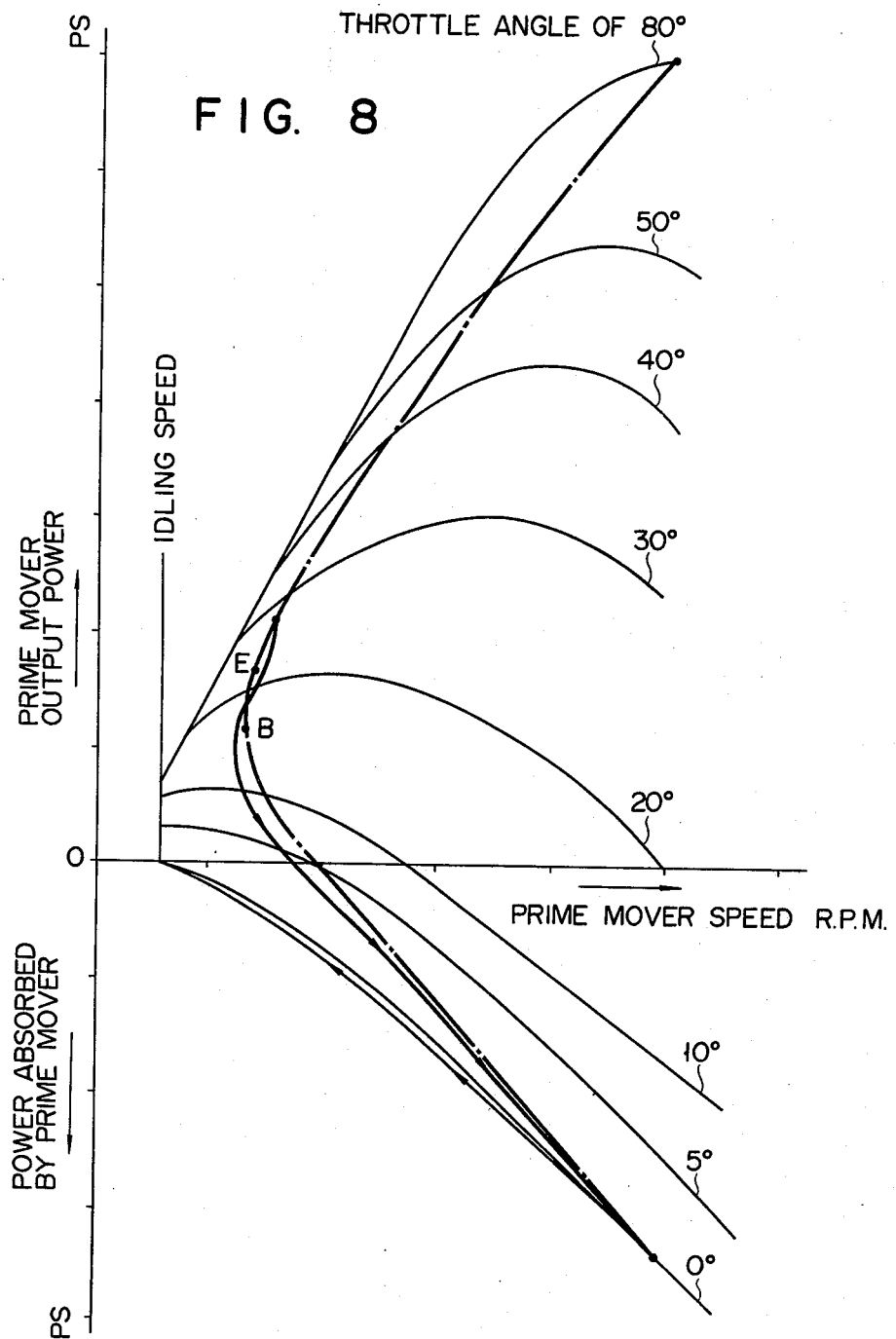
Figure 9:
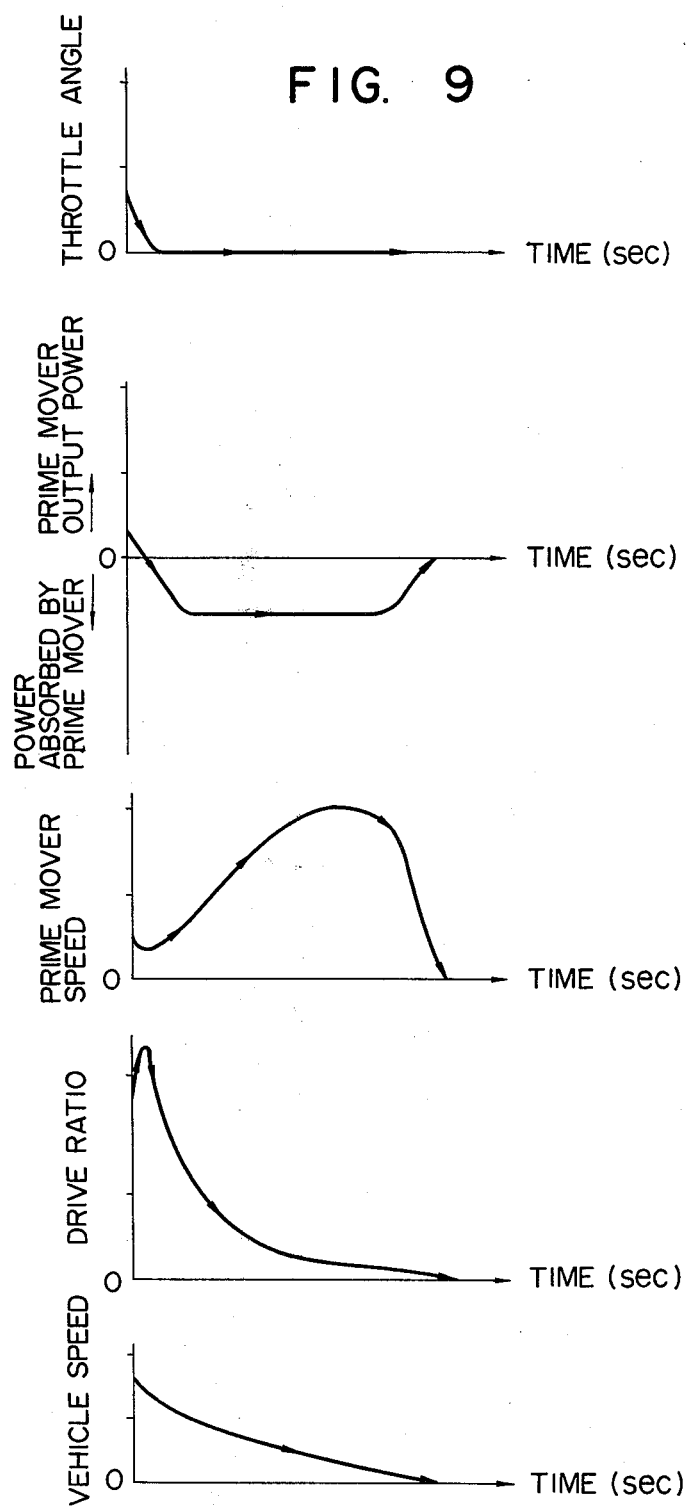

When the throttle angle remains at zero when the vehicle speed declines, then the drive ratio of the transmission 2 falls until the prime mover speed attains a maximum level, causing the prime mover 1 to absorb the largest amount of power with a resultant sharp decline in the vehicle speed. This maximum absorption of power continues just before the vehicle is brought to rest. At this time, the drive ratio of the transmission 2 is actually reduced to zero. The prime mover speed falls to the idling level and the vehicle is fully brought to rest by a separate braking device. The manner in which the prime mover 1 is operated in the above-mentioned case is indicated in the arrowed line of FIG. 8. FIG. 9 shows changes with time in the throttle angle, the output power and speed of the prime mover 1, the absorption of said power, the drive ratio of the transmission 2 and the vehicle speed.

Figure 10:
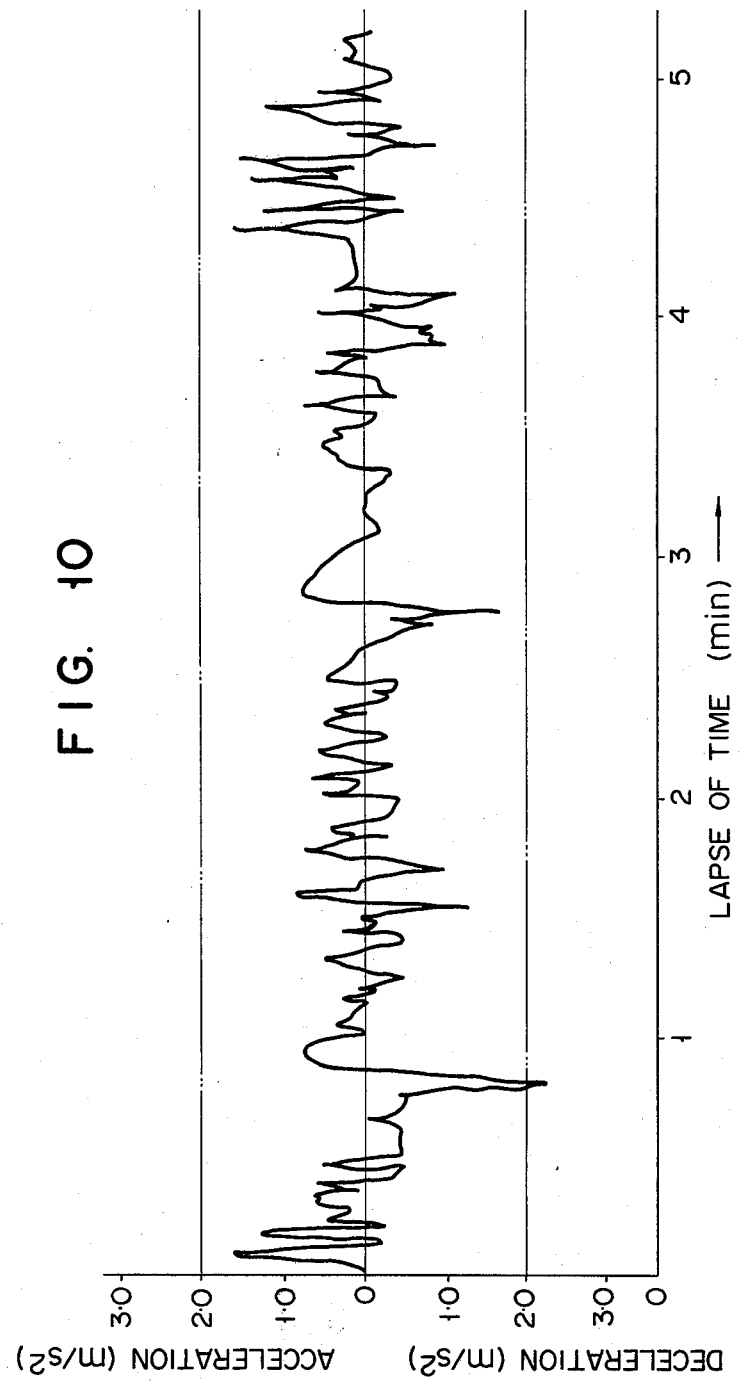
FIG. 10 diagrammatically shows the degrees of acceleration and deceleration of a general medium-size passenger automobile as measured when it runs through city districts.

FIG. 10 sets forth the degrees of acceleration and deceleration required for a medium size passenger car provided with a gasoline engine and a stepwise transmission to run through a city district. FIG. 10 shows that except for emergencies, 2 meters per square second will be sufficient for the deceleration of the vehicle traveling through such a district.

Figure 11:
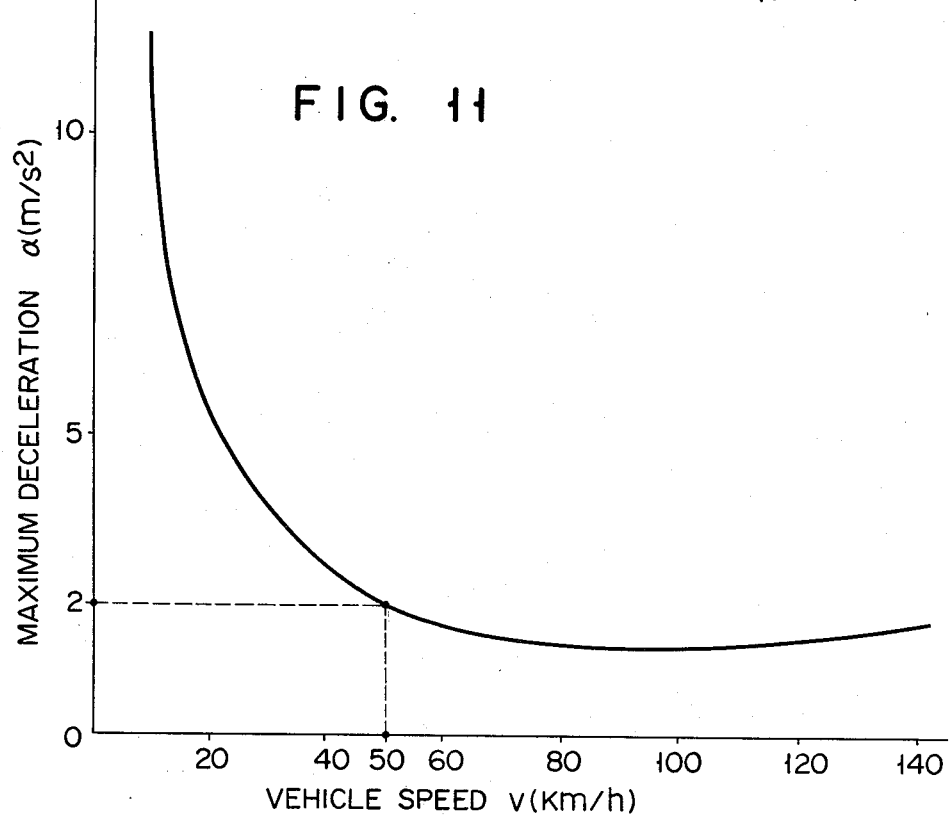
FIG. 11 is a diagram showing the degrees of deceleration of an automobile provided with the control system of the invention.

FIG. 11 shows a maximum degree of deceleration applied under normal conditions to a vehicle equipped with the control system of this invention when the accelerator pedal is released with the vehicle driven at a given speed. The degree of deceleration given in FIG. 11 was calculated on the assumption that a vehicle and a prime mover carried thereon had the same masses as those of the above-mentioned medium size passenger car; an extremely short time was required for the throttle angle to be reduced to zero after release of the accelerator pedal; the prime mover could always absorb a maximum amount of power, because the drive ratio of a continuously variable drive ratio transmission constituted as an oil pressure type took a very minute length of time to reach a zero level from a given one. The formula of calculation adopted runs as follows:

$$a = \frac{75}{m \cdot v}(Nb + Ns)$$

where:
$a$ = degree of deceleration
$m$ = mass of an automobile
$v$ = vehicle speed
$Nb$ = amount of horse power absorbed by the prime mover
$Ns$ = resistance to the vehicle run expressed in horse power As seen from FIG. 11, the control system of this invention enables a vehicle running at a lower speed than 50 km/h corresponding to that at which it travels through a city district to be decelerated in a time of 2 m/s², proving that the control of the speed, namely, the drive and dynamic braking of a vehicle can be effected simply by the operation of a single accelerator pedal. Practically, this dynamic braking is more effeciently attained by the action of the rotatable parts including the flywheel.

Figure 12:
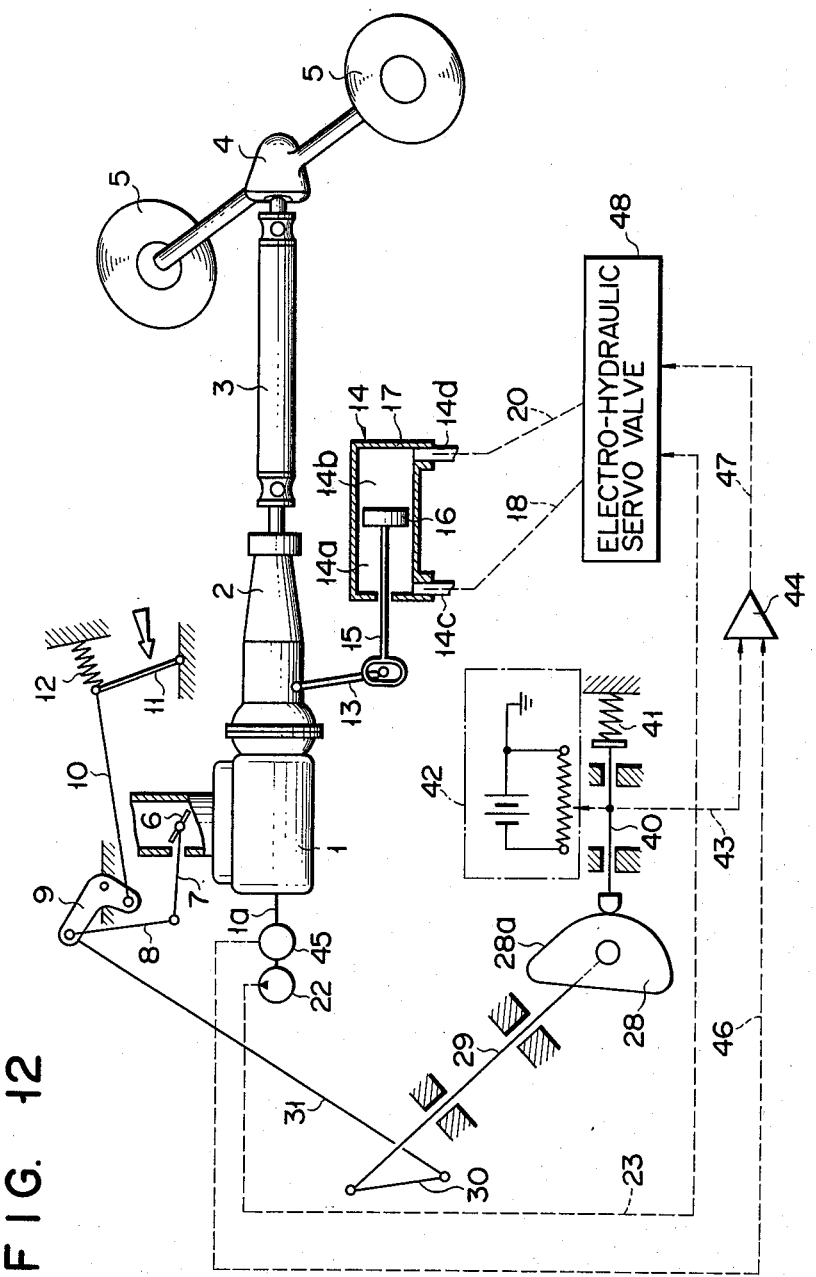
FIGS. 12 and 13 are schematic views of a control system according to a second and a third embodiment of the invention.

The control system according to the second embodiment of this invention of FIG. 12 is the type where the mechanical servo section including the servo valve 19 of the first embodiment of FIG. 1 is replaced by an electrical system. The other parts of FIG. 12 the same as those of FIG. 1 are denoted by the same numerals, and only briefly described. According to the second embodiment of FIG. 12, a cam 28 is connected, as in FIG. 1, to an accelerator pedal 11 through a link mechanism. When the accelerator pedal 11 is depressed, the cam 28 rotates about the shaft 29. A follower rod 40 engages the specially designed surface 28a of the cam 28. The follower rod 40 has its left end portion normally pressed against the cam surface 28a by a spring 41. The follower rod 40 corresponds to the cap-shaped follower member 27 of FIG. 1. When the rod 40 is horizontally displaced by the rotation of the cam 28, the amount of said displacement is converted into a corresponding electrical signal by a linear potentiometer 42 acting as pilot pressure signal-generating means. This pilot pressure signal is supplied to a comparator 44 through a line 43.

The output shaft 1a of the prime mover 1 is provided with an electrical rotation speed detector 45 in place of the output speed-responsive pressure generating governor valve 25 of FIG. 1. The speed-responsive detector 45 supplies the comparator 44 with an electrical pilot pressure signal corresponding to the prime mover speed through a line 46. The detector 45 is of the customary type and consists of a generator provided with a revolving magnet.

The comparator 44 compares an output signal from the potentiometer 42 and that from the detector 45 in respect to voltage and delivers a command signal denoting the result of said comparison to the customary electro-hydraulic servo valve 48 through a line 47. This servo valve 48 is supplied with a prescribed amount of oil pressure by the pump 22 through the line 23. The oil pressure resulting from the command signal supplied through the line 47 is delivered selectively to the port 14c or 14d of the actuator 14, causing the movement of the piston 16 and also the variation of the drive ratio of the transmission 2 through the drive ratio adjusting lever 13.

According to the embodiment of FIG. 12, as in that of FIG. 1, the throttle angle and prime mover speed have a prescribed relationship shown in FIG. 14, namely, the output power and speed of the prime mover maintain a specified relationship indicated in a dot-dash line in FIG. 2. Therefore, the cam 28 has the same specially designed surface 28a as in FIG. 1.

Figure 13:
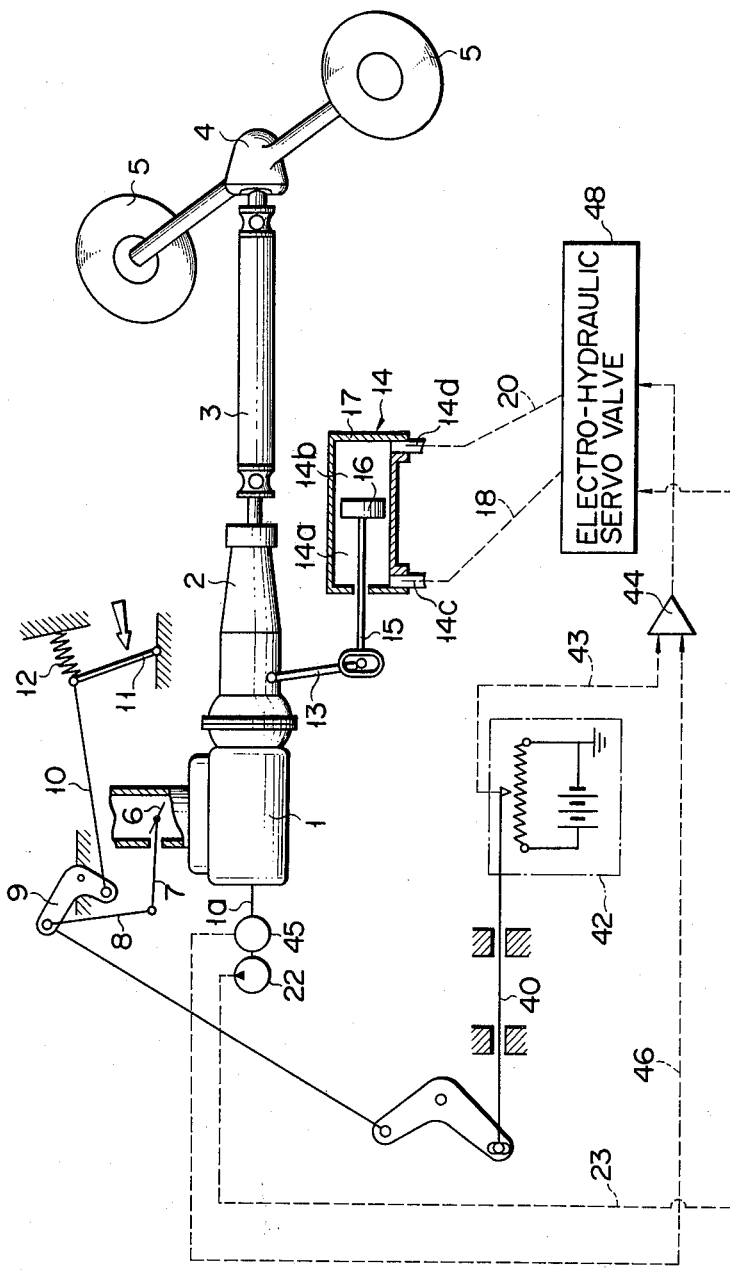

FIG. 13 illustrates a control system according to a third embodiment of this invention. In this embodiment, as in those of FIGS. 1 and 12, the throttle angle and speed of the prime mover are also designed to have such a relationship as is represented by the curve of FIG. 14. The third embodiment has substantially the same arrangement as that of FIG. 12, only differing in that the potentiometer 42 of FIG. 13 having nonlinear characteristics replaces the cam 28 of FIG. 12. The follower rod 40 of the potentiometer 42 is connected to the accelerator pedal 11.

Throughout the embodiments of FIGS. 1, 12 and 13, the throttle angle and speed of the prime mover maintain a prescribed relationship shown in FIG. 14, with the result that the output power and speed of the prime mover bear a specified relationship indicated in FIG. 2. When, therefore, the accelerator pedal 11 is depressed, the prime mover is driven with fuel consumed in the smallest possible amount for its substantially complete combustion, thereby preventing harmful gases from being evolved from the exhaust. Moreover, when the vehicle is slowed down by release of the accelerator pedal 11, dynamic braking can be effectively carried out.

The above-mentioned advantages of this invention are also attained by causing the output torque and throttle angle of the prime mover to have a prescribed relationship shown in FIG. 15 or by establishing a specified relationship given in FIG. 16 between the output torque and speed of the prime mover.

Figure 17:
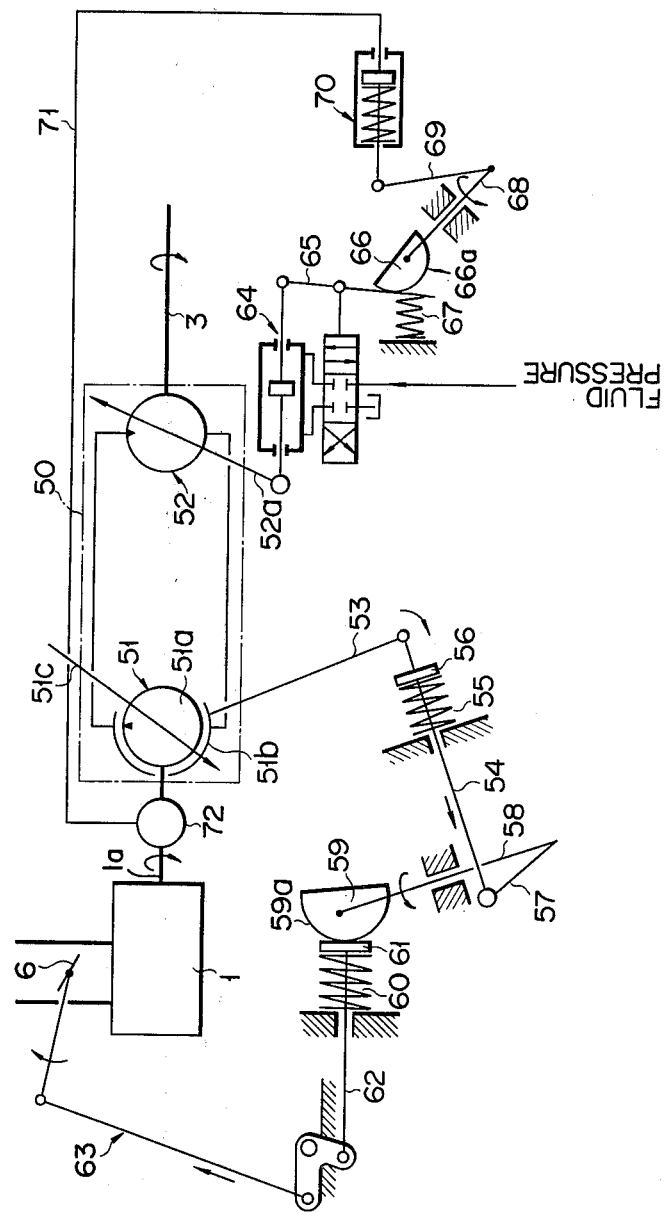
FIG. 17 is a schematic view of a control system according to a fourth embodiment of the invention.

FIG. 17 presents a control system according to a fourth embodiment of this invention, where the throttle angle and output torque of the prime mover have a prescribed relationship presented in FIG. 15 to attain the object of the invention.

Some parts of FIG. 17 the same as those of FIG. 1 are denoted by the same numerals, namely, the prime mover is shown by referential numeral 1, throttle by 6, prime mover output shaft by 1a and propeller shaft by 3.

A continuously variable drive ratio transmission 50 comprises a variable displacement oil pressure pump 51 and a variable displacement oil pressure motor 52. The oil pressure pump 51 is connected to the output shaft 1a of the prime mover 1 to be driven thereby. The drive of the pump 51 leads to the rotation of a pump rotor 51a, which in turn generates oil pressure energy, with the resultant drive of the oil pressure motor 52. The drive of said motor 52 is transmitted to the propeller shaft 3 for its rotation.

The reaction-actuated casing 51b of the oil pressure pump 51 rotates about the prime mover shaft 1a when subjected to the reaction torque of the rotor 51a. The reaction-actuated casing 51b is fitted to one end of a link 53, the other end of which is connected to another link 54. Thus, the rotation of the casing 51b is converted into the movement of the link 54 in the direction of the indicated arrow to compress a compression spring 55. One end of the spring 55 is fixed to a spring support plate 56, which in turn is fitted to the link 54. Accordingly, the spring support plate 56 is displaced to an extend varying with the magnitude of a reaction torque equal to the output torque of the prime mover applied to the oil pressure pump 51. Namely, the link 54 moves in proportion to the output torque of the prime mover 1.

The movement of the link 54 is transmitted through a link 57 to one end of a shaft 58 for its rotation, the other end of which is connected to a cam 59 having a specially designed cam surface 59a. The rotation of the shaft 58 and in consequence the cam 59 leads to the movement of a follower member 61 pressed against the cam surface 59a by a compression spring 60. The movement of the follower member 61 is transmitted to a link 62, to which one end of said member 61 is fixed.

The link 62 is connected to a throttle 6 through a link mechanism 63 to broaden the angle of the throttle 6 according to the amount of movement of the link 62.

Under the above-mentioned arrangement, therefore, the output torque of the prime mover 1 defines the amount of rotation of the cam 59. The relationship between the rotation of the cam 59 and throttle angle is determined by the shape of the cam surface 59a. Said relationship is so chosen as to coincide with the prescribed relationship between the output torque and throttle angle of the prime mover 1 shown in FIG. 15.

Means 51c for varying the displacement $D_p$ of the oil pressure pump 51 is manually operated by a vehicle driver. Means 52a for adjusting the displacement $D_M$ of the oil pressure motor 52 is automatically controlled by the later described arrangement including an oil pressure-actuated follow up servo mechanism 64. The output terminal of the servo mechanism 64 is connected to the above-mentioned displacement adjusting means 52a of the oil pressure motor 52, and the input terminal thereof is connected to the input lever 65. The surface 66a of a cam 66 is pressed against the input lever 65 by being urged by a compression spring 67. The cam 66 is connected to a shaft 68, link 69, actuator 70, oil pressure line 71 and output speed-responsive pressure generating governor valve 72 in succession. Accordingly, the actuator 70 is operated by the oil pressure supplied through the line 71 which corresponds to the rotation speed of the output shaft 1a of the prime mover 1. The shaft 68 and in consequence the cam 66 are rotated according to the amount of movement of the piston rod received in the actuator 70. Therefore, the prime mover speed is eventually converted to the rotation angle of the cam 66. The cam surface 66a is designed as follows:

$$n_1/D_M = k \text{ (constant)} \tag{1}$$

wherein $n_1$ is the prime mover speed.

Further, from the continuity equation associated with a fluid running between the oil pressure pump and motor is derived the following equation:

$$n_1 \cdot D_P = n_2 \cdot D_M \text{ or } n_2 = D_P \frac{n_1}{D_M} \tag{2}$$

From the equations (1) and (2) above results the following equation:

$$n_2 = k \cdot D_P \tag{3}$$

Figure 18:
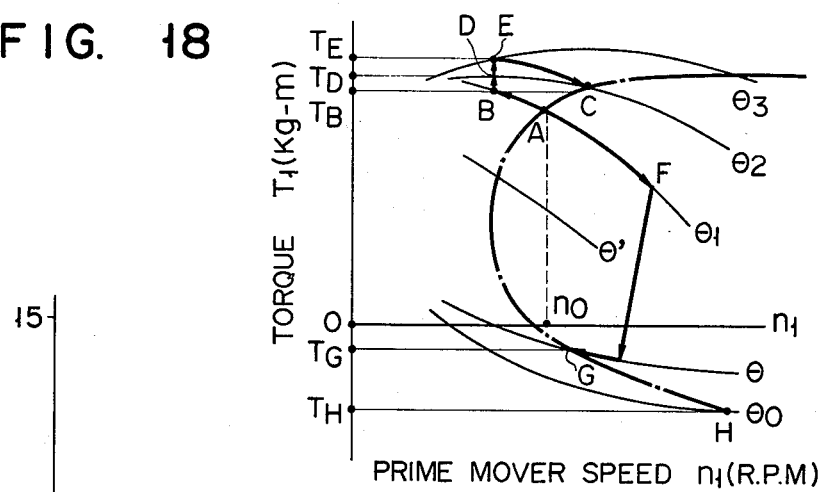
FIG. 18 illustrates the operating condition of a prime mover provided with the control system of the fourth embodiment of FIG. 17.

When the vehicle driver sets $D_P$, the rotation speed $n_2$ of the propeller shaft 3 is normally maintained at a fixed value. Where an excess load is applied to the propeller shaft 3, then $n_2$ falls and $n_1$ also decreases as seen from the equation (2). As shown in the diagram of FIG. 18, therefore, the point A on the line of the throttle angle $\theta_1$ at which $n_1$ and $T_1$ maintain a balanced relationship is displaced to the point B due to the decline of $n_1$, causing the prime mover torque $T_1$ to be changed to $T_B$. As the result, the throttle angle is changed to $\theta_2$ corresponding to the point C on the dot-dash line so as to cause the relationship of $n_1$ and $T_1$ to be displaced to said point C. Since, at this time, the prime mover speed $n_1$ can not be changed rapidly, the prime mover torque reaches $T_D$ and then advances to $T_E$, leading to the enlargement of the throttle angle to $\theta_3$. Thus the excess prime mover torque is applied to the propeller shaft 3, causing $n_2$ and in consequence $n_1$ to be elevated. Where $n_1$ decreases, $D_M$ is reduced to fix the value of the ratio $$\frac{n_1}{D_M}$$

of the equation (1) with the resultant increased drive ratio $$\frac{n_2}{n_1}.$$

Accordingly, a larger load is applied to the prime mover to facilitate the elevation of the prime mover torque and broaden the throttle angle.

Where the enlarged throttle angle causes the prime mover to produce an excess torque and in consequence $n_1$ rises above $n_0$, then the drive ratio declines from the normal level due to the elevation of $n_1$ and in consequence $D_M$. As the result, the prime mover torque falls and the throttle angle is again contracted. The section defined between $T_E$ and $T_B$ in FIG. 18 denotes an accelerated torque. At this time, the prime mover torque reaches the point C on the dot-dash line.

Where $D_P$ is decreased through operation of the displacement adjusting means 51c of the oil pressure pump 51, then the drive ratio $$e = \frac{n_2}{n_1} = \frac{D_P}{D_M}$$

has a smaller value. Thus, the operating condition of the prime mover, namely, the relationship of $n_1$ and $T_1$ is shifted to the point F on the line denoting the throttle angle $\theta_1$ to reduce the prime mover torque and in consequence the rotation angle of the cam 66. Since, at this time, $n_1$ has a larger value, the output speed-responsive pressure generating governor valve 72 gives forth a signal to increase $D_M$ with the resultant decline of the drive ratio $e$. Accordingly, the throttle angle is more contracted to cause the prime mover torque to be settled at an absorbable level $T_G$.

Where $D_P$ is decreased through operation of the displacement adjusting means 51c, then the absorbed torque of the prime mover reaches a maximum value $T_H$, thereby attaining the acceleration and deceleration of an automobile simply by operation of said displacement adjusting means 51c, except for emergencies.

The throttle angle of the prime mover 1 can be indirectly found by detecting a negative pressure in a manifold corresponding to said throttle angle. Where the continuously variable drive ratio transmission 50 consists of an oil pressure type, the output torque of the prime mover 1 can be indirectly ascertained by detecting the corresponding oil pressure by which said oil pressure type transmission 50 is operated.

What we claim is:

1. A system for controlling the drive and dynamic braking of automobiles having a prime mover provided with an output shaft, a continuously variable drive ratio transmission coupled with the output shaft of the prime mover and a driven load, which comprises:
   a. personally operable means; and
   b. an automatic control line including
      1. throttle means for controlling the supply of motive fluid to the prime mover,
      ii. means for varying the drive ratio produced by the continuously variable drive ratio transmission,
      iii. means for detecting the rotation speed of the prime mover, and
      iv. a servo mechanism provided with a source of fluid pressure,
   whereby the automatic control line maintains according to the movement of the personally operable means a predetermined relationship between any two of the three factors: the throttle angle, speed and output torque of the prime mover, said predetermined relationship being so established that as the output power of the prime mover increases from a positive intermediate value relatively near zero, the prime mover speed rises in approximately direct proportion; as the output power of the prime mover decreases toward zero, the prime mover speed also advances; and as the prime mover absorbs a larger amount of power, the prime mover speed is rapidly elevated.

2. A system for controlling the drive and dynamic braking of automobiles having a prime mover provided with an output shaft, a continuously variable drive ratio transmission coupled with the output shaft of the prime mover and a driven load, which comprises:

a. a source of fluid pressure;
b. a personally operable pedal capable of being depressed from its normal position by an automobile driver against the force of a spring;
c. throttle means for controlling the supply of motive fluid to the prime mover;
d. first linkage means for connecting the pedal to the throttle means, thereby enlarging the angle of the throttle according as the pedal is depressed to a deeper extent;
e. a cam member provided with a cam surface on the periphery and designed to rotate about its own shaft;
f. second linkage means for connecting the cam member to the pedal, thereby increasing the amount of rotation of the cam member according as the pedal is depressed to a deeper extent;
g. a follower member pressed against the cam surface of the cam and designed to be shifted according to the rotation of the cam;
h. a servo actuator device including a cylinder, a movable piston received in the cylinder and a piston rod fixed to the piston, with the cylinder divided into two chambers by the piston, said chambers being provided with ports respectively, thereby supplying fluid pressure selectively to either of said chambers through the port for the movement of the piston and piston rod;
i. a drive ratio adjusting member connected to the piston rod so as to vary the drive ratio produced by the continuously variable drive ratio transmission according to the movement of the piston rod;
j. a servo valve device for supplying fluid pressure delivered from the source of fluid pressure selectively to either of the ports of the servo actuator device;
k. means for supplying the servo valve device with a first pilot pressure signal according to the movement of the follower member;
l. means connected to the output shaft of the prime mover so as to supply the servo valve device with a second pilot pressure signal proportional to the prime mover speed;
m. said servo valve device comparing the magnitudes of the first and second pilot pressure signals, supplying fluid pressure to one chamber of the servo actuator device through the corresponding port when one of said pilot pressure signals has a higher magnitude than the other, and supplying fluid pressure to the other chamber of the servo actuator device through the corresponding port when the other of said pilot pressure signals has a higher magnitude;
n. the cam surface of the cam having such a shape that as the throttle angle is enlarged due to the deeper depression of the pedal, the prime mover speed is increased while a predetermined relationship is maintained with the throttle angle under the condition in which the prime mover consumes a minimum amount of fuel; and as the throttle angle progressively falls toward zero due to the smaller depression of the pedal, the prime mover speed is rapidly elevated in approximately linear relationship with the throttle angle, causing the first pilot pressure signal-generating means continuously to give forth a first pilot pressure signal through the follower member, whereby, as the output power of the prime mover increases from a positive intermediate value relatively near zero, the prime mover speed rises in substantially direct proportion; as the output power of the prime mover progressively declines toward zero, the prime mover speed rises accordingly; and as the prime mover absorbs a larger amount of power, a predetermined relationship is maintained between the output power and speed of the prime mover so as to attain the rapid increases of the prime mover speed.

3. A control system according to claim 2, wherein the servo valve device is a servo pilot valve comprising outlet ports communicating with the ports of the servo actuator device; an inlet port supplied with fluid pressure from the source of fluid pressure; another inlet port supplied with a second pilot pressure signal from the prime mover speed-responsive means; and a spool provided with three valve lands, said spool being supplied at one end with a second pilot pressure signal, and wherein the first pilot pressure signal-generating means is a compression spring, one end of which is fitted to the facing end of the spool and the other end of which is attached to the follower member, thereby applying pressure counteracting the pressure represented by the second pilot pressure signal to the spool as a first pilot pressure signal.

4. A control system according to claim 2, wherein the first pilot pressure signal-generating means is a potentio-meter having linear characteristics and giving forth a first pilot pressure signal corresponding to the movement of the follower member; the prime mover speed-responsive means is an electrical prime mover speed detector fitted to the output shaft of the prime mover so as to generate a second pilot pressure signal corresponding to the prime mover speed; and the servo valve device includes a comparator for electrically comparing the voltages of the first and second pilot pressure signals so as to send forth an electrical signal denoting the result of said comparison and an electro-hydraulic servo valve.

5. A control system according to claim 2, wherein the source of fluid pressure is a positive displacement pump fitted to the output shaft of the prime mover.

* * * * *